United States Patent Office 3,002,884
Patented Oct. 3, 1961

---

3,002,884
HORTICULTURAL PROCESS WITH N-HALOMETHYL-1,2-BENZISOTHIAZOLIN - 3 - ONE-1,1-DIOXIDES FOR CONTROLLING FUNGUS DISEASES
Chien-Pen Lo, Philadelphia, Pa., assignor to Rohm & Haas Company, Philadelphia, Pa., a corporation of Delaware
No Drawing. Filed Apr. 15, 1959, Ser. No. 806,433
2 Claims. (Cl. 167—33)

This invention concerns N-halomethyl-1,2-benzisothiazolin-3-one-1,1-dioxides and a method for their preparation, the halogen of the halomethyl group having an atomic weight of at least 35.

It will be recognized that the expression 1,2-benzisothiazolin-3-one-1,1-dioxide is applied to the structure encountered in saccharin and its derivatives. Since this name is cumbersome, there may conveniently be used hereinafter the trivial term saccharin in the place of this longer, complex expression. Thus, the above compounds will be called N-halomethylsaccharin.

While superficially there is a resemblance between the halomethylsaccharins and N-(2-chloroethyl)saccharin, the reaction of bromochloromethane gives only N,N'-methylenedisaccharin. The halomethylsaccharins enter reactions which are not practical with N-(2-chloroethyl)saccharin. Again, the halomethylsaccharins are excellent fungicidal agents, whereas N-(2-chloroethyl)saccharin has no practical fungicidal value. This is also true of N-alkyl-saccharins, such as N-methylsaccharin. It was, therefore, an unexpected discovery that the N-halomethylsaccharins are quite fungicidally active.

For the preparation of the N-halomethylsaccharins there are reacted N-hydroxymethylsaccharin and a reactive halogen compound. The mixture is reacted between about 50° and 175° C., conveniently under reflux of the reaction mixture. An inert organic solvent may be used, if so desired. Solvent and any surplus of halogenating compound may be removed by distillation. The N-halomethylsaccharin may be purified, if so desired, as by crystallization.

Hydroxymethylsaccharin is a known compound. It may be prepared by reacting saccharin with formaldehyde. The product which separates when a hot reaction mixture is cooled is suitable for reaction with a halogenating reagent. It may, however, be recrystallized from an organic solvent, such as ethylene dichloride. Recrystallized material melts at 128°–130° C.

Suitable halogenating reagents include phosphorus trichloride or tribromide, thionyl chloride, hydrobromic acid, hydriodic acid, or a metal iodide and acid.

It may be commented that because of the chemical reactivity of N-chloromethylsaccharin, it can be readily converted with a metal iodide, such as potassium iodide, to N-iodomethylsaccharin. This is a preferred method for forming the iodomethyl compound.

Typical preparations are described in the following examples, which are given for purposes of illustration and not by way of limitation. Parts are by weight unless otherwise designated.

Example 1

A portion of 106.5 parts of N-hydroxymethylsaccharin was pulverized and mixed with 195 parts of thionyl chloride. This mixture was heated under reflux (about 80° C.) for about one-half hour. A clear solution resulted. The reaction mixture was warmed to distill off excess of thionyl chloride and volatile product under reduced pressure. The residue of 128 parts which resulted consisted chiefly of N-chloromethylsaccharin. It was dissolved in hot ethylene dichloride, an insoluble salt being filtered off. The filtrate was evaporated to dryness to give a white solid which melted at 135°–141° C. This product was recrystallized from carbon tetrachloride to yield pure N-chloromethylsaccharin which melted at 140°–142° C. and contained by analysis 15.8% of chlorine and 6.0% nitrogen (calculated 15.3% chlorine and 6.05% nitrogen).

Example 2

A portion of 21.3 parts of powdered N-hydroxymethylsaccharin was mixed with 28 parts of phosphorus trichloride. This mixture was heated under reflux for about one-half hour. Volatile material was taken from the reaction mixture under reduced pressure. The residue was then taken up in hot carbon tetrachloride. The resulting solution was filtered and the filtrate was evaporated to dryness to give 13.5 parts of N-chloromethylsaccharin melting at 139°–144° C.

Example 3

A portion of 21.3 parts of powdered N-hydroxymethylsaccharin was mixed with 42 parts of 48% hydrobromic acid solution and 12 parts of concentrated sulfuric acid. The mixture was stirred and heated on a steam bath for 3 hours. The reaction mixture was then poured into an excess of water at about 0° C. A solid separated, was filtered off, washed with water and dried at room temperature to give 15 parts of N-bromomethylsaccharin. This product was recrystallized from carbon tetrachloride and then melted at 146° C. to 149° C. It contained by analysis 29.5% of bromine and 5.0% of nitrogen (calculated 29.0% bromine and 5.1% nitrogen).

Example 4

There were mixed 9.3 parts of N-chloromethylsaccharin, 6.6 parts of potassium iodide and 40 parts of acetone. The mixture was stirred and heated under reflux for 2½ hours (two and one-half hours). The reaction mixture was poured into an excess of cold water. A solid formed which was filtered off, washed with water, and dried in the air. This product was recrystallized from ethylene dichloride to give N-iodomethylsaccharin which melted at 152°–155° C. On analysis, this product was found to contain 37.0% of iodine and 4.3% of nitrogen (theory: 39.3% of iodine and 4.3% of nitrogen).

Preparations suitable for fungicidal applications may be prepared in the form of dusts or sprays. The halomethylsaccharin may be taken up on or mixed with a finely particled solid carrier, such as talc, diatomaceous earth, pyrophyllite, hydrated silica, or a clay or mixture of inert solids. Dusts may be prepared containing 1% to 15% of the active agent. If desired, dispersing and/or wetting agents may be utilized in the dusts. With increases in the proportion of wetting agent and/or dispersing agent there results a wettable powder. Typical formulations for a wettable powder comprise 20% to 50% of a halomethylsaccharin, 45% to 75% of one or more finely divided solids, 1% to 5% of a wetting agent, and 1% to 3% of a dispersing agent. Typical wetting agents include sodium alkylbenzenesulfonates, sodium dodecyl sulfate, and alkylphenoxypolyethoxyethanols or other non-ionic polyether. Typical dispersing agents comprise lignin sulfonates and condensed naphthalene-formaldehyde sodium sulfonate. A wettable powder can be taken up in water and applied as a spray to plants to be protected from fungus diseases. Such powder may also be diluted with additional solid or solids in finely divided form to provide dusts.

Emulsifiable liquid concentrates are prepared by dissolving a halomethylsaccharin in an organic solvent, such as ethylene dichloride and mixing therewith a solvent-soluble emulsifying agent. For example, 20 parts of a halomethylsaccharin may be taken up in 76 parts of chlorinated solvent and 4 parts of a dioctylphenoxypolyethoxyethanol added.

The N-halomethylsaccharins were tested for fungicidal action by the standard fungitoxicity test in which germination or inhibition of germination of spores of test organisms is observed on slides. They were also biologically evaluated in the greenhouse for control of late blight on tomato plants. In slide tests, N-chloromethylsaccharin gave an $ED_{50}$ value (i.e., the number of parts per million giving a 50% control), of 5 p.p.m. against *Alternaria solani*, of 5–10 p.p.m. against *Monilia fructicola*, and 10–50 p.p.m. against *Stemphylium sarcinaeforme*.

In the late blight test on tomatoes an $ED_{50}$ value of 180 was obtained with the chloromethyl compound. There was no injury to the tomato plants from applications up to one percent and above.

In the slide-germination tests with N-bromomethylsaccharin $ED_{50}$ values of 10–50 p.p.m. were found against both *Alternaria solani* and *Stemphylium sarcinaeforme*. A value of about 50 was obtained against *Monilia fructicola*.

The compound N-iodomethylsaccharin provided $ED_{50}$ values of 10–50 p.p.m. against *Alternaria solani*, of 1–10 p.p.m. against *Monilia fructicola*, and 10–50 p.p.m. against *Stemphylium sarcinaeforme*. In late blight tests it gave an $ED_{50}$ value of 360.

These compounds have high tenacity and good persistency when exposed to rain and to high moisture.

I claim:

1. A process for controlling fungus diseases of growing plants which comprises applying to plants an N-halomethyl-1,3-benzisothiazolin-3-one-1,1-dioxide in which the halogen of the halomethyl group has an atomic weight of at least 35.

2. A process for controlling fungus diseases of growing plants which comprises applying to plants an N-chloromethyl-1,2-benzisothiazolin-3-one-1,1-dioxide.

References Cited in the file of this patent

UNITED STATES PATENTS 2,701,799    D'Amico _____ Feb. 8, 1955

FOREIGN PATENTS 1,093,728    France _____ Nov. 24, 1954

OTHER REFERENCES

Frear et al.: J. of Economic Entomology, vol. 40, pages 736–41, 1947.